United States Patent [19]

Plofchan

[11] Patent Number: 4,897,572
[45] Date of Patent: Jan. 30, 1990

[54] LIGHT TUBE WITH SLIDABLE ELECTRODES

[76] Inventor: Fred A. Plofchan, 11006 W. Jefferson, River Rouge, Mich. 48218

[21] Appl. No.: 298,743

[22] Filed: Jan. 19, 1989

Related U.S. Application Data

[62] Division of Ser. No. 170,887, Mar. 21, 1988, Pat. No. 4,843,521.

[51] Int. Cl.⁴ .............................................. H01J 61/06
[52] U.S. Cl. .................................. 313/146; 313/152; 313/160
[58] Field of Search ............... 313/146, 152, 160, 161, 313/631, 632

[56] References Cited

U.S. PATENT DOCUMENTS

| | | | |
|---|---|---|---|
| 2,282,325 | 5/1942 | Epstein | 313/152 X |
| 3,059,135 | 10/1962 | Mineta | 313/152 X |
| 3,529,209 | 9/1970 | Leinhard et al. | 313/152 X |
| 4,002,499 | 1/1977 | Winston | 136/206 |
| 4,116,540 | 9/1978 | Thomas | 350/293 |
| 4,327,969 | 5/1982 | Giutronich | 350/296 |
| 4,641,315 | 2/1987 | Draggoo | 372/72 |

*Primary Examiner*—Kenneth Wieder
*Attorney, Agent, or Firm*—John C. Evans

[57] ABSTRACT

A wide angle flash tube reflector has dual involute surfaces thereon intersecting at a cusp and bent in the horizontal to intercept light from a light source adjacent the cusp and to reflect such light in a dispersion pattern that spreads the flash coverage to match extended light coverages of lenses from a normal focal length to extreme wide angle. One light source is in the form of a bent tube having adjustably positioned cathode and anode electrodes for varying the length of a plasma arc to control the extent of the dispersion pattern reflected from the dual involute surfaces.

2 Claims, 3 Drawing Sheets

LIGHT TUBE WITH SLIDABLE ELECTRODES

This is a division of application Ser. No. 170,887, filed on Mar. 21, 1988, now U.S. Pat. No. 4,843,521.

BACKGROUND AND SUMMARY OF THE INVENTION

This invention relates to flash units and more particularly to reflectors for dispersing light from a light source to match flash coverage to the coverage of a range of camera lens coverages and in particular to match coverages of a wide range of lens types.

In the past, various type reflectors have been used to illuminate camera subjects in an attempt to avoid shadows and to match the flash coverage to the lens coverage so as to avoid underexposed or dark regions on standard size photosensitive film types.

Studio lighting systems have included light reflectors configured as a parabolic dish with a center located flash tube socket. Such reflectors produce a light dispersion pattern which is brighter in the vicinity of the center of the parabolic dish and which is less bright at the edges of the dish.

It is also known to provide a variety of separate flash units for connection to camera bodies to produce a flash pattern from each of the separate flash units which is matched to different lens focal lengths connected to the camera body.

Other flash units combine horizontal and vertical bounce capabilities established by an adjustable mechanical mount which provides rotation and tilting of the reflectors as well as zoom positioning of the reflector to cover a wide range of lens types.

Other flash units, all parabola based reflectors, include retractable wide angle diffusers which will disperse light from a reflector matched to a normal angle lens so as to match the reflector to wider angle lenses.

Another category of flash tube/reflector assemblies is used to concentrate light from a pulsed plasma source for generating a laser beam therefrom. Such assemblies have reflectors which are horizontally linear and operative to concentrate light from a light source in a desired manner. In certain of the prior art assemblies such concentration is obtained by use of reflectors having an involute shape to concentrate radiating plasma energy from a flash tube to the laser source. Examples of such reflector/collector assemblies are set forth in U.S. Pat. No. 4,002,499 issued July 26, 1974 for Radiant Energy Collector; U.S. Pat. No. 4,327,969 issued May 4, 1984 for Radiation Concentrator and Distributor; and U.S. Pat. No. 4,641,315, issued Feb. 3, 1987, for Modified Involute Flashlamp Reflector. Another patent showing a reflector with involute sections is set forth in U.S. Pat. No. 4,116,540 to Winston, issued in 1978.

None of the aforesaid prior art patents have a pair of reflector surfaces which are of involute section bent horizontally to extend the dispersion of reflected light. Specifically, they do not disclose flash units with reflectors configured to match the coverage of wide angle lens. The reflector system of the present invention is a wide angle flash reflector and has an improved performance compared to a parabola. The 35 mm format is considered herein only for presentation simplicity (it being understood that the system of the present invention will work in any format). The 35 mm focal length lens is the longest focal length lens considered (slightly) wide angle. A known parabola type reflector, on the other hand, cannot cover a 28 mm lens view without a diffusing filter.

In accordance with my invention, a reflector is configured to have dual involute surfaces intersecting at a cusp and wherein each such surface is bent in the horizontal to define an extended reflection surface for a light source near the cusp to disperse visible light therefrom in an extended pattern matched to a range of lens coverages from wide angle to telephoto.

A feature of the present invention is to provide a reflector having an improved curved, dual involute surface for use in dispersing light in illumination products including vehicle headlamps, spotlights, studio lights, flash light systems, infrared heaters, street lights, curved florescent lights and any other illuminating situations wherein an extended dispersion of light is desirable.

Another feature of my invention is to provide such a curved, dual involute reflector in association with a light source that includes a plasma arc whose length can be adjusted to vary the amount of light reflected from the reflector.

Yet another feature of my invention is to provide an improved flash tube with means thereon to adjust the length of the plasma arc.

Still another aspect of my invention is to provide a flash tube of the type in the preceding paragraph wherein the flash tube includes movable anode and cathode electrodes located interiorly of the tube and means located exteriorly of the tube to adjust the position of such electrodes to control the distance therebetween so as to vary the length of the plasma arc within the tube when an ionization potential is imposed across the electrodes.

In a specific embodiment of the invention the reflector has first and second involute surfaces with edge boundaries thereon joined to form a cusp. Each of the involute surfaces are bent horizontally to locate the cusp therebetween in an arcuate path in a plane intersecting the involute surfaces.

A light tube is located adjacent the cusp for directing plasma energy against the involute surfaces for producing a reflected light pattern of a wide angle form established by the vertical extent of the individual involute surfaces and the aperture between the individual involute surfaces so as to disperse the light source in an extended field of illumination.

In the case of a flash assembly, the light pattern dispersion is configured to match the lens coverage of wide angle and normal lenses. In the case of wide angle lens use, the light pattern dispersion controls underexposure in the perimeter regions of most popular size photosensitive films.

The preferred embodiment of the reflector of my invention includes involute surfaces which are symmetrical with respect to a horizontal plane through the longitudinal axis of the flash tube. Furthermore, the involute surfaces are formed to have the outermost edge thereof laterally offset with respect to the cusp and the cusp defines a circle in a horizontal plane intersecting the involute surfaces.

The preferred embodiment of the flash tube includes a sealed vacuum tube of light transparent material. The flash tube is bent to conform to the curvature of the cusp. A cathode electrode is slidably supported inside one end of the sealed tube and an anode electrode is slidably supported inside the opposite end of the sealed tube. Each of the electrodes is connected to an extensible high voltage lead. The extensible lead imposes a high voltage pulse between the electrodes when the flash is triggered. The high voltage pulse produces a plasma arc between the electrodes. A magnet is mounted on the exterior of the tube to slide with respect to the tube so as to attract an electrode to change the length of the plasma arc and thereby change the intensity of the light directed against the reflector.

While the variable length plasm arc is shown in a curved tube suitable for particular use with the dual involute curved cusp reflector of the present invention it is equally suitable for use with other shapes of tubes including straight tubes used in connection with parabolic reflectors.

Additional advantages, features and objects of my invention will become apparent from the following description and the appended claims taken in conjunction with the accompanying drawings wherein.

DETAILED DESCRIPTION OF THE PREFERRED EMBODIMENTS

Figure 1:
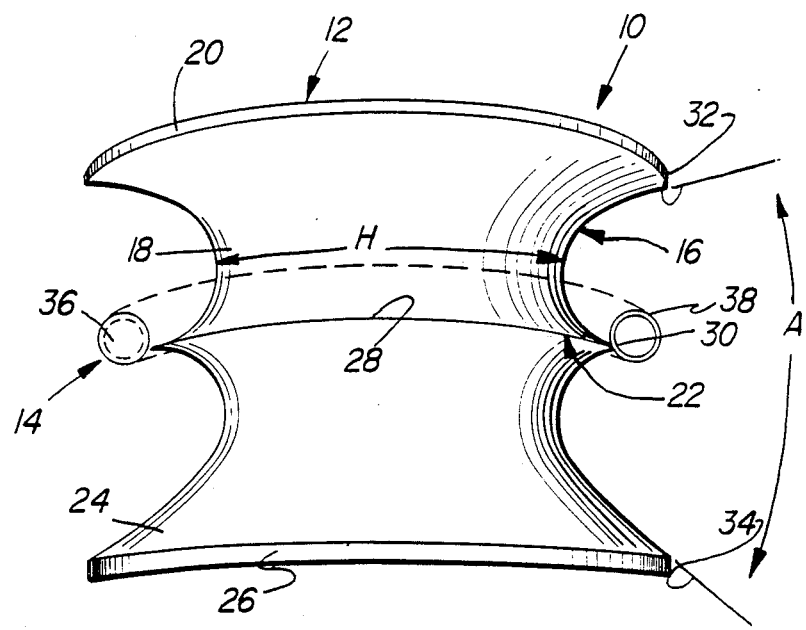
FIG. 1 is a perspective view of a dual involute, curved reflector in accordance with the present invention.

Referring now to FIG. 1, a flash assembly 10 is illustrated including a fixed reflector 12 and a flash tube 14. In accordance with my invention, the fixed reflector 12 has a surface configuration which will produce an improved dispersion of light from the flash tube 14.

Specifically, the fixed reflector 12 has a dual involute surface 16 defined by a first involute surface segment 18 which is bent horizontally. The first involute surface segment 18 has a vertically displaced outboard edge 20 and an inboard edge 22. A second involute surface segment 24 of the dual involute surface 16 is also bent horizontally. Segment 24 has a vertically displaced outboard edge 26 and an inboard edge 28. The edges 22, 28 join to form a cusp 30 which is located laterally inwardly o each of the outboard edges 20, 26. The aperture A for reflected light is determined by the angle of divergence between the tangent lines 32, 34 to the involute segments 18, 24 at the outboard edges 20, 26 thereof. In the illustrated embodiment of FIG. 1, the light dispersion targets 140° horizontal and 90° vertical without use of filtering devices, bounce umbrellas, diffusion screening or other devices which reduce light intensity.

In the flash assembly 10, the flash tube 14 is a vacuum sealed, light transmissive tube filled with an ionizable medium such as Zenon gas. The tube has a cathode electrode 36 at one end thereof and an anode electrode 38 at the opposite end thereof.

Figure 3:
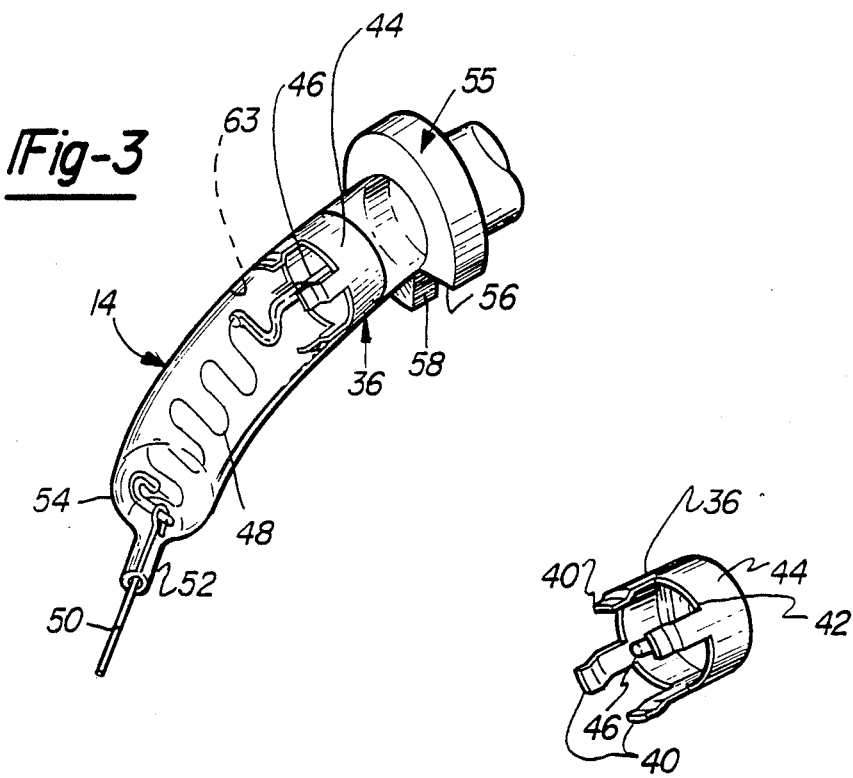
FIG. 3 is a fragmentary elevation view of a flash tube for use with a reflector of the form shown in either FIGS. 1 or 2.
Figure 4:
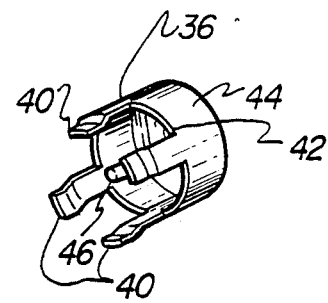
FIG. 4 is a enlarged perspective view of a movable electrode used in the flash tube of FIG. 3.

Each of electrodes 36, 38 are slidably located inside the ends of the flash tube 14. FIG. 3 shows the end of the tube 14 which receives the cathode electrode 36. The operation and form of the cathode electrode 36 is described as follows with it being understood that the anode cathode 38 has the same form, fit and function. Bent friction spring tabs 40 extend from the outboard edge 42 of a cup 44 portion of the electrode 36. The friction spring tabs 40 center the electrode 36 within the flash tube 14 and support the electrode 36 for slidable adjustment within the flash tube 14.

A high voltage pin 46 connects to the cup 44 and provides a connection point to one end of an extensible high voltage lead 48. The high voltage lead 48 has its opposite end connected to a terminal 50. The terminal 50 is sealed against a small diameter sleeve 52 at one end of the flash tube 14 and extends therefrom for connection to a suitable source of voltage which can be triggered to produce a plasma arc between the electrodes 36, 38.

The same details exist on the anode electrode 38 at the opposite end of the flash tube 14. The high voltage lead 48 has an electrical insulation sheath 54 thereon to limit the length of the plasma arc to the distance between the electrodes 36, 38.

The shape conformation between flash tube 14 and the curved, dual involute reflector 12 provides a bent, rectangular reflected beam of uniform intensity. While discussed with reference to a flash assembly for photographic work, the reflector design is equally suited for use with other illuminating devices.

For example, the reflector 12 is suitable for use in sealed beam headlamps, infrared heaters, wide vista flashlights, curved fluorescent lamps, street lamps and other devices benefitted by uniform light dispersion.

Figure 5:
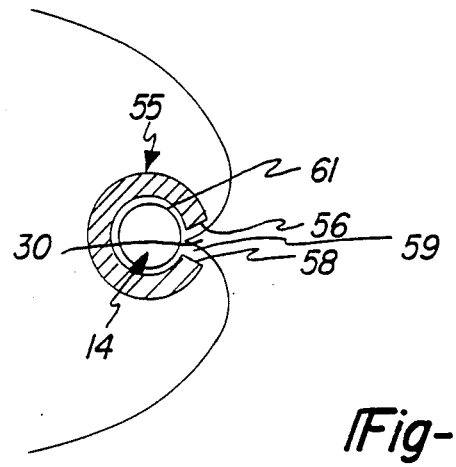
FIG. 5 is a sectional view of a reflector showing the relationship of the movable magnet, flash tube and cusp region of a reflector including dual involute curved reflector surfaces.

Another feature of my invention is that the electrodes 36, 38 can be readily positioned from exterior of the flash tube 14 to vary the length of the plasma arc and the resultant intensity of the flash. To this end I provide a movable magnet 55 on the outer surface of the flash tube at a point near the electrode 36. A like magnet (not shown) can be provided near the electrode 38 to adjust its position. The magnet 55 in the embodiment of the invention shown in FIG. 5, has a circular form with a break therein formed by a pair of ends 56, 58. The ends 56, 58 define a relief space 59. The relief space 59 receives the cusp 30 and is sized so that the magnet 54 is freely slidable on the outer surface 61 of flash tube 14. The attractive force of the magnet 54 is selected so that it will overcome the frictional force between the spring tabs 40 and the inner surface 63 of the flash tube 14 when the magnet 55 is moved into proximity to the electrode cap 44. At this point movement of the magnet 55 will change the location of the electrode 36 in the flash tube to adjust the length of the plasma arc during a flash operation. Such length adjustment matches light reflectance to variable length lens systems or to a specific lens coverage. For example, a light dispersion pattern for a telephoto lens can be matched to its lens coverage by moving the electrodes 36, 38 together to reduce the plasma arc length. A wider light dispersion pattern to match the coverage of a wide angle lens is provided by spacing the electrodes farther apart.

Once the electrodes 36, 38 are properly positioned they can be energized by sources of high voltage such as known capacitor storage/trigger systems to impose a high voltage potential thereacross that will condition an ionizable material such as Zenon until it is ionized sufficiently to breakdown and produce a plasma arc between the electrodes 36, 38.

Figure 2:
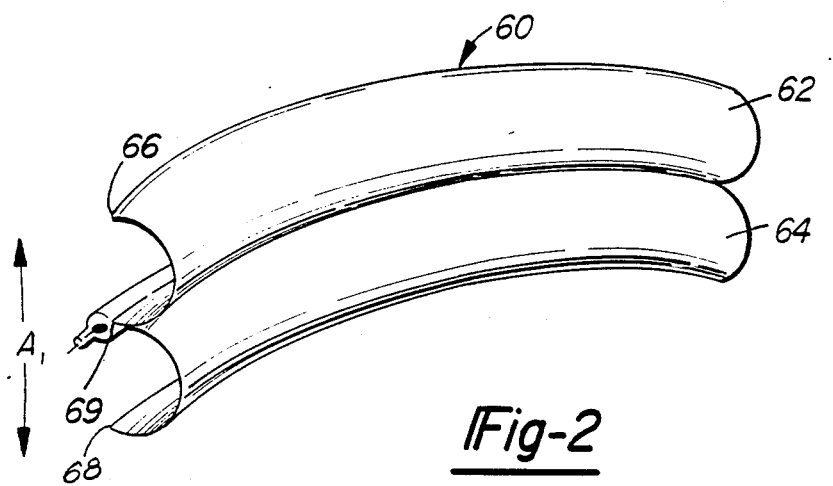
FIG. 2 is a perspective view of another embodiment of a dual involute curved reflector including the present invention.

Another embodiment of a reflector in accordance with my invention is shown in FIG. 2 In this embodiment a curved dual involute reflector 60 includes first and second involute segments 62, 64 respectively including outboard edges 66, 68. The inboard edges of the involute segments 62, 62 are joined at a cusp 69. The cusp 69 is formed substantially in the same vertical plane as the outboard edges 66, 68. The aperture A, in this embodiment forms a 90° horizontal dispersion of light and a 90° vertical dispersion. A curved flash tube 71 located adjacent cusp 69 has a curvature conformed to that of the cusp 69 to produce an extended field light dispersion pattern.

Figure 6:
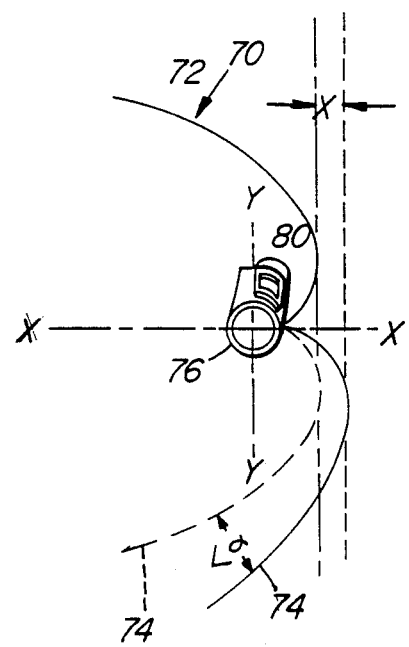
FIG. 6 is a diagrammatic view showing a dual involute curved reflector having an increased aperture produced by an asymmetrical arrangement of the dual involutes.

Yet another embodiment of my invention is shown in FIG. 6 which shows a single line outline of an asymmetrical dual involute 70. In this embodiment the dual involute 70 has a first involute surface 72 corresponding to the surface 18 in the embodiment of FIG. 1. A second involute surface 74 is offset by a distance X to produce a modified aperture which extends the vertical light dispersion from a flash lamp 76. The illustrated adjustment of vertical light targeting is provided by angular ( ) rotation of surface 74 from a first line parallel to the Y-axis of the flash lamp 76 and in a plane perpendicular to the X-axis of the flash lamp 76.

Figure 7:
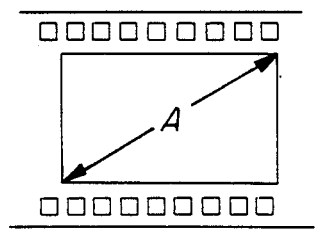
FIG. 7 is a diagrammatic view of the picture area on a 35 mm film format which has the surface thereof illuminated in an improved fashion by the reflector of the present invention.

FIG. 7 shows a standard 35 mm film format with photosensitive coating through the picture area diagonal A. The aforesaid lens types provide adjustability to fully cover the lens coverage of a 35 mm lens to match the light dispersion thereto so as to assure full exposure of all of the film area. If a shorter focal length (wide angle) lens were used, the dispersion of the aforesaid flash units would also provide a desired match of the light dispersion to the film diagonal to cover the film area exposed to light through the shorter focal length lens (i.e., 20 mm–28 mm). The longest focal length lens on the 35 mm camera format should be 35 mm in length.

Specifically, a length of sprocketed 35 mm film upon which is drawn a rectangular box representing the true image size: the diagonal line (a) is a dimensional length measured in millimeters. It sets the formula for determining the length (also measured in millimeters) of a normal viewing lens for the aforementioned film size. A shorter focal length lens than the diagonal (A) dimension of the film size is considered a wider angle than normal lens, thus a lens longer than the diagonal dimension of the film format would be considered telephoto. I consider my invention to be especially suited to service the wide angle aspect of photography.

The embodiments of the invention shown in FIG. 1, FIG. 2 and FIG. 6 all serve to focus plasma arc/strobe flash light into a uniform intensity (no hot spot) light pattern. While horizontal light spreads from 90° to 140° are shown, the angle of light energy reflectance can be configured in the horizontal to a full circle 360° and in the vertical to approximately 140°.

While visible light applications are discussed, the invention has equal applicability to heat energy devices utilizing wave lengths from the infrared through the visible light spectrum to ultraviolet wavelengths.

While adjustment of plasma arc length is discussed, an adjustable shade 80 (FIG. 6) could be provided to control the amount of reflection of a fixed length plasma arc and its light energy from the surfaces 72, 74.

What is claimed is:

1. In a light source having a tube filled with an ionizable medium, the improvement comprising:
   electrode means slidably supported interiorly of said tube for varying the pattern of ionization of the ionizable medium;
   said tube having inner and outer surfaces;
   positioning means on said outer surface of said tube for locating said electrode means interiorly of said tube;
   said electrode means including first and second spaced electrodes having friction springs thereon engageable with said inner surface of said tube for holding said first and second electrodes in an adjusted position; and
   said positioning means including magnet means slidably supported on the outer surface of said tube.

2. In a light source having a tube filled with an ionizable medium, the improvement comprising:
   electrode means slidably supported interiorly of said tube for varying the pattern of ionization of the ionizable medium;
   said tube having inner and outer surfaces;
   positioning means on said outer surface of said tube for locating said electrode means interiorly of said tube;
   said electrode means including first and second spaced electrodes, each of said first and second spaced electrodes having an annular cap and spring tabs on said annular cap biased between said inner surface of said tube and said annular cap for holding said first and second electrodes in an adjusted position.

* * * * *